No. 874,939. PATENTED DEC. 31, 1907.
F. B. CLAYTON & G. D. SPIELBERGER.
REFRIGERATOR BUILDING.
APPLICATION FILED JUNE 22, 1907.
5 SHEETS—SHEET 1.
FIG. I.
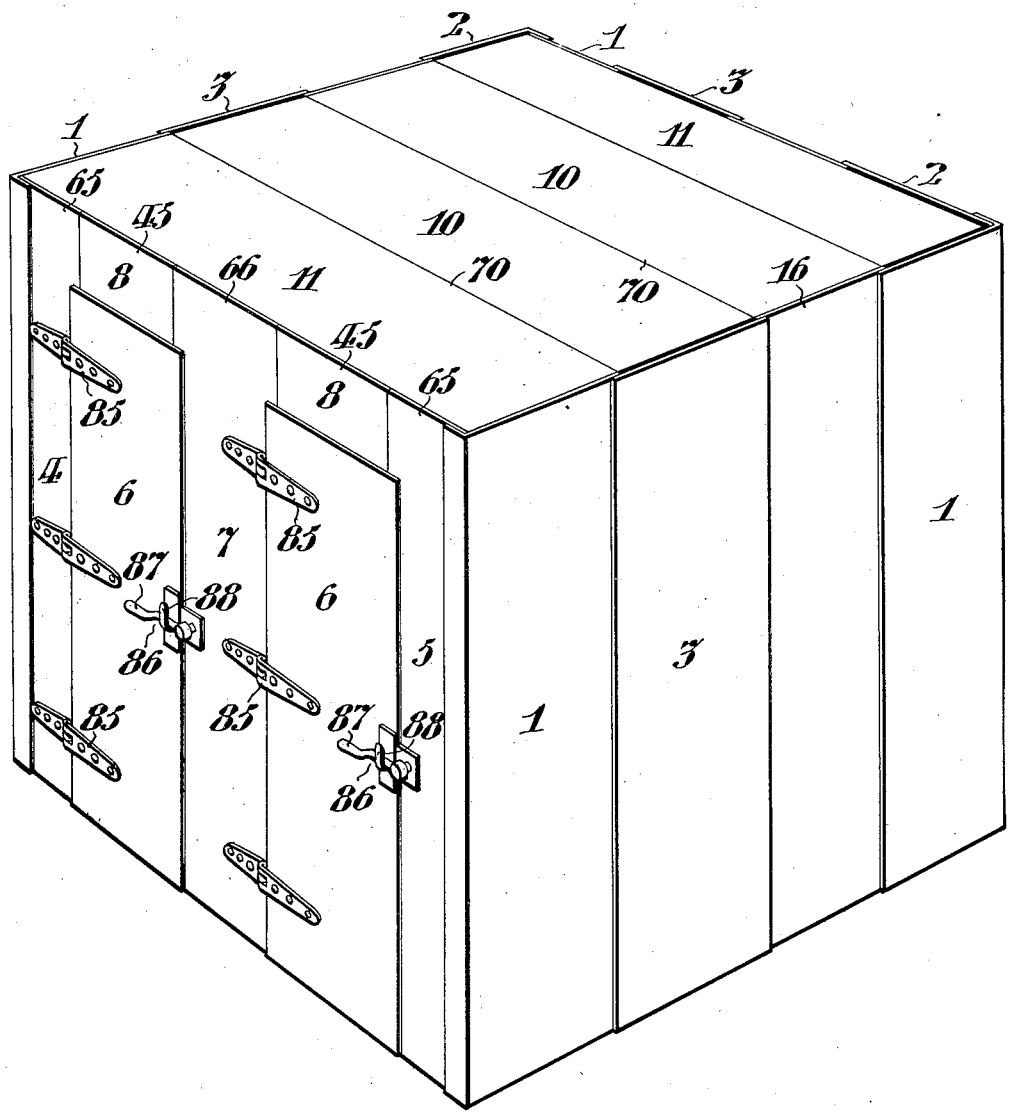
WITNESSES:
Clifton C. Hallowell
Thomas H. Kerr
INVENTORS.
FRANK B. CLAYTON
AND
GEORGE D. SPIELBERGER, No. 874,939. PATENTED DEC. 31, 1907.
F. B. CLAYTON & G. D. SPIELBERGER.
REFRIGERATOR BUILDING.
APPLICATION FILED JUNE 22, 1907.
5 SHEETS—SHEET 2.
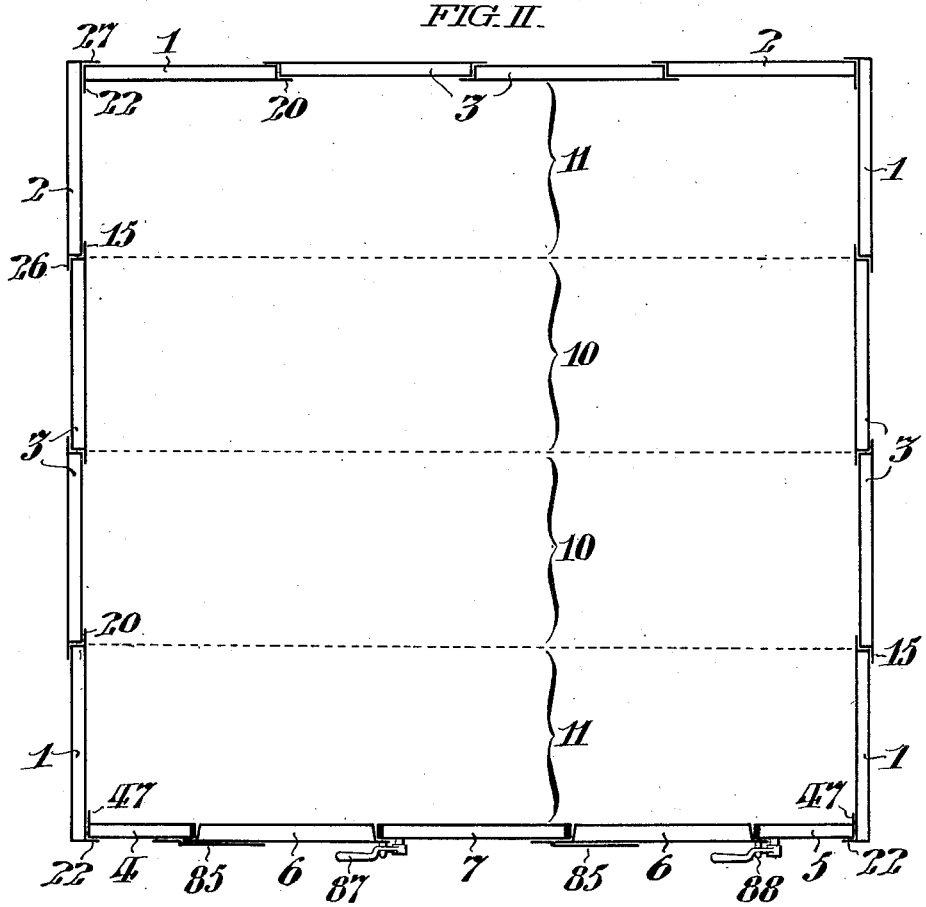
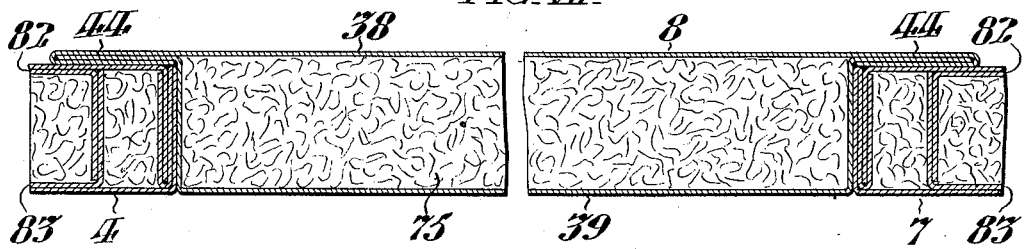
WITNESSES:
Clifton C. Hallowell
Thomas H. Kerr
INVENTORS:
FRANK B. CLAYTON
AND
GEORGE D. SPIELBERGER,
by Arthur E. Paige
Atty.

No. 874,939. PATENTED DEC. 31, 1907.
F. B. CLAYTON & G. D. SPIELBERGER.
REFRIGERATOR BUILDING.
APPLICATION FILED JUNE 22, 1907.
5 SHEETS—SHEET 3.
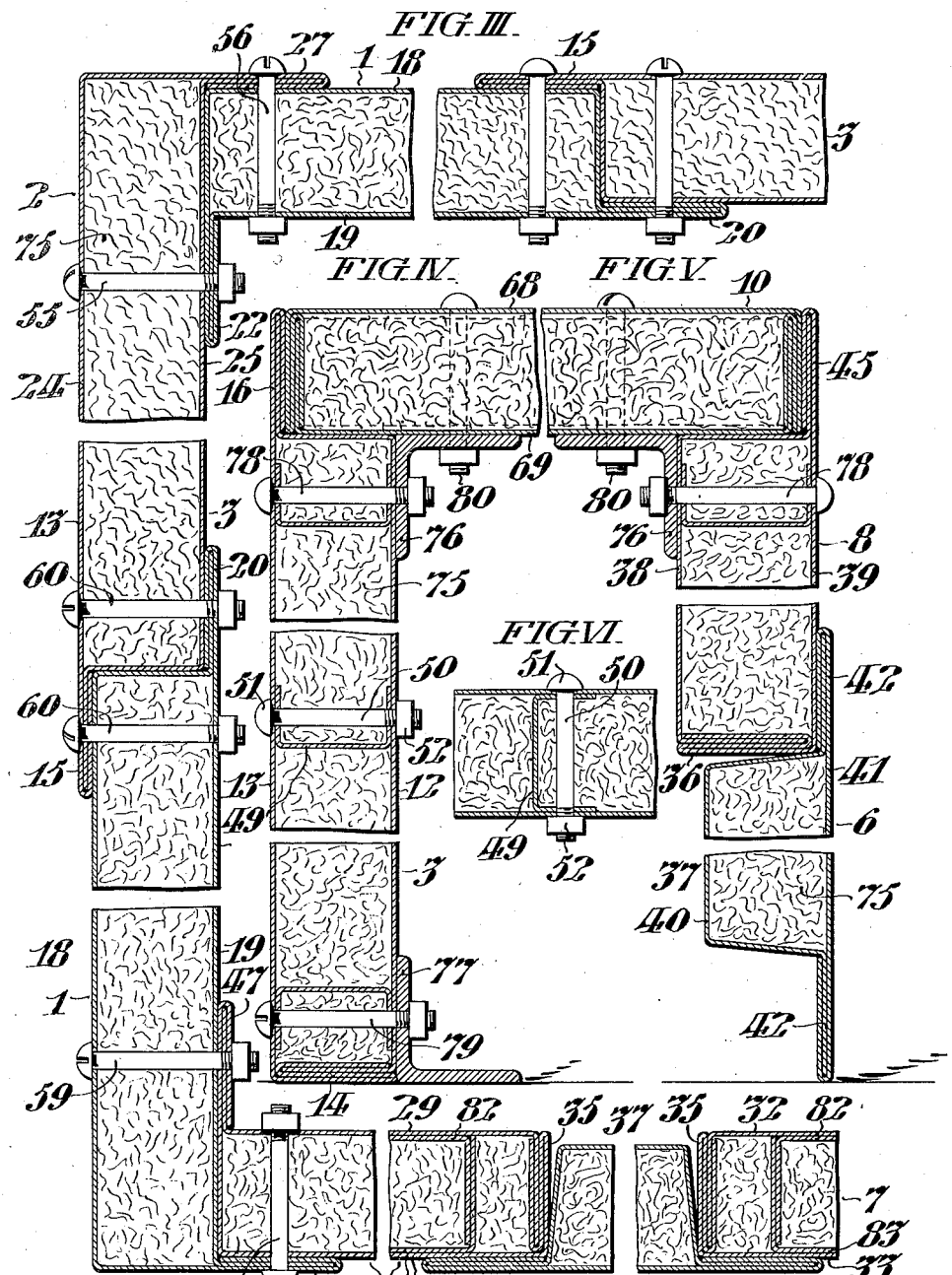
WITNESSES:
Clifton C. Hallowell
Thomas H. Kerr
INVENTORS:
FRANK B. CLAYTON
AND
GEORGE D. SPIELBERGER,
by Arthur E. Paige,
Atty.

No. 874,939. PATENTED DEC. 31, 1907.
F. B. CLAYTON & G. D. SPIELBERGER.
REFRIGERATOR BUILDING.
APPLICATION FILED JUNE 22, 1907.
5 SHEETS—SHEET 4.
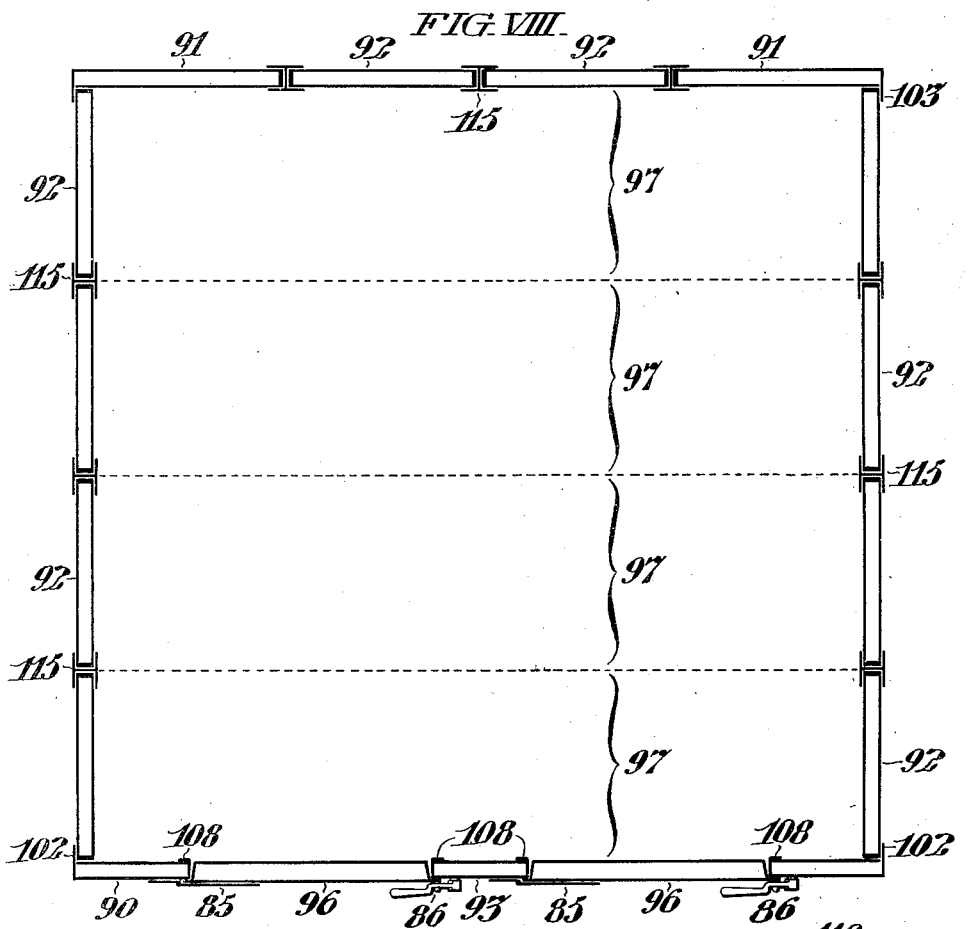
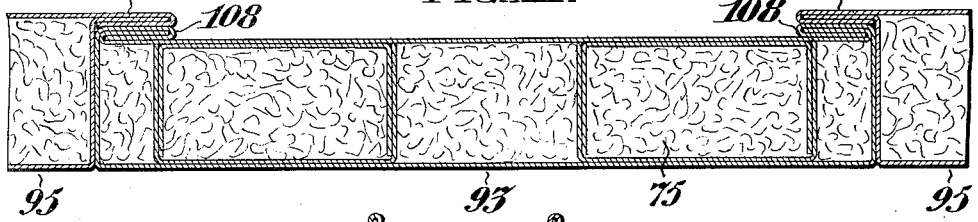
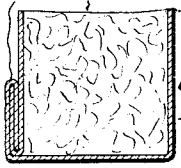
WITNESSES:
INVENTORS:
FRANK B. CLAYTON
AND
GEORGE D. SPIELBERGER

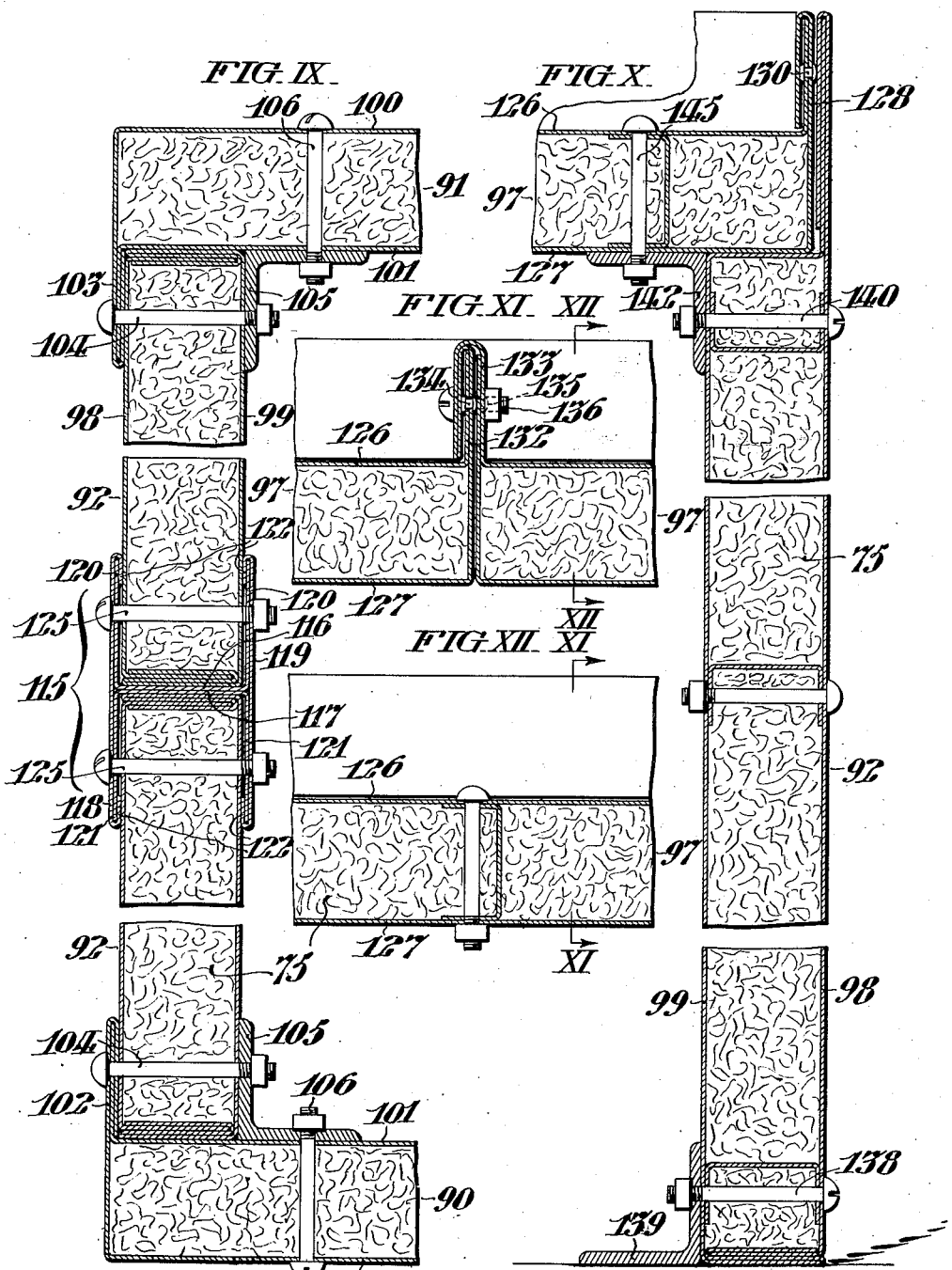

UNITED STATES PATENT OFFICE.

FRANK B. CLAYTON AND GEORGE D. SPIELBERGER, OF PHILADELPHIA, PENNSYLVANIA.

REFRIGERATOR-BUILDING.

No. 874,939.  Specification of Letters Patent.  Patented Dec. 31, 1907.

Application filed June 22, 1907. Serial No. 380,216.

*To all whom it may concern:*

Be it known that we, FRANK B. CLAYTON and GEORGE D. SPIELBERGER, of Philadelphia, in the State of Pennsylvania, have invented a certain new and useful Improvement in Refrigerator-Buildings, whereof the following is a specification, reference being had to the accompanying drawings.

It is the object of our invention to provide separable unit wall panels which are nonconductors of heat, and which comprise means whereby a plurality of such members may be so assembled as to form a chamber of any desired extent.

We have designated our invention an improvement in refrigerator buildings, merely to accord with the classification made by the Patent Office, and do not desire to restrict our invention to the formation of rooms from which heat is to be excluded. For instance, our invention may be employed with particular advantage in the formation of rooms for drying purposes, where the function of the walls is to retain the heat.

In the form of our invention hereinafter described the unit panels each comprise opposed sheet metal plates, which are maintained in spaced relation by brace bars, and which are interlocked at their edges, and inclose a filling of any suitable material which is a nonconductor of heat. The interlocking means includes flanges formed on said panels arranged to overlap adjacent panels, and flanges which interlock with flanges on adjacent panels.

Our invention includes the various novel features of construction and arrangement hereinafter more definitely specified.

In the drawings; Figure I, is a perspective view of a building embodying our invention. Fig. II, is a plan sectional view of said building. Fig. III, is a fragmentary plan sectional view, showing the front, rear and side walls and their junctions. Figs. IV, and V, are fragmentary vertical sectional views showing the rear and front walls and their respective junctions with the opposite ends of a roof panel. Fig. VI, is a fragmentary vertical sectional view of a roof panel, showing one of the brace bars. Fig. VII, is a fragmentary plan sectional view of a panel which extends over a door. Fig. VIII, is a plan sectional view of a building similar to that shown in Fig. II, but comprising a modified construction. Fig. IX, is a fragmentary plan sectional view of the structure shown in Fig. VIII, showing the front, rear and side walls and their junctions. Fig. X, is a fragmentary vertical sectional view, showing a side wall and its junction with a roof panel. Fig. XI, is a fragmentary vertical transverse sectional view, taken on the line XI, XI, in Fig. XII, showing the junction of two roof panels. Fig. XII, is a fragmentary vertical longitudinal sectional view of a roof panel, taken on the line XII, XII, in Fig. XI. Fig. XIII, is a fragmentary plan sectional view of the vertical panel between the doors and a panel which extends over the doors; showing their junctions. Fig. XIV, is a fragmentary vertical sectional view of the upper edge of said vertical panel between the doors. Figs. XV and XVI, are fragmentary sectional views of the upper and lower edges respectively of a panel which extends over a door.

Referring to Figs. I to VII inclusive; the assembled structure comprises the corner panels 1, and 2, intermediate panels 3, stile panels 4, and 5, door panels 6, muntin panel 7, frieze panels 8, and roof panels 10, and 11. The panels each comprise opposed sheet metal plates, maintained in space relation by brace bars, between which a filling of asbestos wool, or other nonconductor of heat may be inclosed by interlocking the margins of said plates.

As best shown in Figs. II, III and IV; the intermediate panels 3, comprise opposed sheet metal plates 12, and 13, whose margins are interlocked to form the bottom edge 14, of the panel, and the flanges 15, and 16, which extend in alinement with said panel plates, respectively at the sides and top thereof. The alternate panels differ in that the side and top flanges 15, and 16, are in a common plane with the plate 12, in one panel, but in respective planes with the plates 12, and 13, in the next panel, so that all of the flanges 16, which are at the tops of the panels, extend at the outer edges of their respective panels to receive the roof panels 10, and 11. The corner panels 1, each comprise opposed sheet metal plates 18, and 19, whose margins are interlocked to form a flange 20, in a plane with its inner plate 19, and a flange 22, at its opposite edge extending from said plate 19, in right angular relation thereto. The corner panels 2, each comprise opposed sheet metal plates 24, and 25, whose margins are interlocked to form a flange 26, in a plane with its outer plate 24, and a flange 27, in angular relation to the inner plate 25.

As best shown in Fig. III; the stile panels 4, and 5, each comprise opposed sheet metal plates 29, and 30, and, the muntin panel 7, comprises opposed sheet metal plates 32, and 33, and said panels have the margins of their respective plates interlocked at the adjacent edges of said panels, to form the side jambs 35, of the doorways 37. As best shown in in Fig. V, the frieze panels 8, each comprise opposed sheet metal plates 38, and 39, whose margins are interlocked to form the lintels 36, for said doorways 37. The door panels 6, each comprise opposed sheet metal plates 40, and 41, having their margins interlocked like the panel 3, to form a flange 42, which extends throughout the entire perimeter of said panel 6, in a plane with the outer plate 41. The margins of said plates 38, and 39, are interlocked to form the side flanges 44, (see Fig. VII), and top flanges 45, (see Fig. V) in plane with said respective plates 38, and 39, and, the outer side margins of the plates 29, and 30, of the stile panels are interlocked to form the angular flange 47, extending from the plate 29.

Within the panels above described, and extending transversely thereto, are series of channel brace bars 49, secured in rigid relation therewith by the bolts 50, whose heads 51, and nuts 52, are disposed on opposite sides of said panels, as best shown in Figs. IV, and VI.

The panels above described may be assembled to inclose a substantially air tight chamber, as follows:—The rear corners of the structure are formed by joining the corner panels 1, and 2, so that the flange 22, of the former overlies the inner plate 25, of the latter and is secured by the bolts 55, and the flange 27, of the panel 2, overlaps the outer plate 18, of said panel 1, and is secured by the bolts 56. The front corners of said structure are formed by joining the corner panels 1 and stile panels 5, with their respective flanges 22, and 47, overlapping the respective plates 30, and 19, and secured by the bolts 58, and 59. The rear and side walls are formed by the connection of the corner panels with the intermediate panels 3, which, as best shown in Fig. II, are faced so that the flanges 15, of alternate panels will be disposed respectively within and without said chamber and overlap the edges of the adjoining panels to which they are secured by the bolts 60, as best shown in Fig. II.

The stile panels 4, and 5, and the muntin panel 7, forming the frame for the door panels 6, have their margins so interlocked as to present flat jambs 35, for the doorways, as best shown in Fig. III, and, as shown in Figs. V and VII, the frieze panels 8, are disposed between said jambs, with their plates 38, and 39, interlocked at their margins, to form the flange 45, at the top, in a plane with the plate 39, and the flanges 44, at the sides, in a plane with the plate 38. As shown in Fig. VII, said side flanges 44, overlap the inner faces of the stile and muntin panels 4 and 7.

The flange 45, extends upwardly in alinement with the flanges 65, and 66, on the stile and muntin panels respectively, and all of the upwardly extending flanges terminate flush with the upper plate of the roof panels 10, and 11, as shown in Figs. I, IV, and V. Said roof panels 10, comprise the opposed sheet metal plates 68, and 69, whose margins are interlocked to form the flanges 70, at their opposite edges, which flanges overlap the adjacent roof panels. The roof panels 11, at the front and rear of the building have their outer side edges interlocked, as at their ends, to present a flat edge, without a flange, against the upwardly extending flanges of the vertical wall panels.

Each of the panels aforesaid, incloses a filling 75, of any suitable material which is a nonconductor of heat, for instance, asbestos wool, and the upper and lower inner ends of the vertical stationary panels forming the walls are secured to the angle irons 76, and 77, respectively by bolts 78, and 79. Said angle iron 76, forms a cornice which extends entirely around the room and to which the roof panels 10, and 11, are conveniently secured by the bolts 80, as shown in Figs. IV, and V. Said angle iron 77, extends around the room, except at the doorways, and forms a surbase.

The panels 4, 5, and 7, forming the jambs for the doorways, each comprise reinforcing pieces 82, and 83, disposed between their opposed plates to strengthen said panels local to the hinges 85, and locks 86. Each of said locks is provided with a handle 87, arranged to engage a hook or keeper 88, on its door panel 6.

Referring to Figs. VIII to XVI inclusive; the assembled structure comprises the front and rear corner panels 90, and 91, respectively, the intermediate panels 92, muntin panel 93, frieze panels 95, door panels 96, and roof panels 97. The intermediate panels 92, each comprise opposed sheet metal plates 98, and 99, whose margins are interlocked to form flangeless bottom and side edges and an upwardly extending flange at its top edge. The corner panels 90, and 91, comprise the opposed sheet metal plates 100, and 101, whose margins are interlocked to form the side flanges 102, and 103, shown in Fig. IX, which extend in right angular relation to the plane of said panels and which are arranged to be secured to the adjacent panels 92, by the bolts 104, which also extend through the angle irons 105, secured to the corner panels 90, by the bolts 106.

As shown in Fig. VIII, the front corner panels 90, and the muntin panel 93, form the jambs of the doorways, and are reinforced as at 108, around the inner edge by interfolding the margins of their plates as shown in Fig. XIII. The adjoining frieze panels 95, being provided with the flanges 110, fitted to said reinforcing folds, are each provided with a similar reinforcing fold 112, (shown in Fig. XVI,) along their lower edges forming the lintels above each doorway. The vertical panels 91, and 92, forming the walls of the structure are conveniently joined by the channel bars 115, one of which is shown in detail in Fig. IX. Said bars 115, are each formed of four strips 116, 117, 118 and 119 of sheet metal. Said strips 116, and 117, being bent U-shaped with their respective side limbs 120, and 121, extending oppositely in alinement with each other are held together by said strips 118, and 119, which extend parallel with said limbs 120, and 121, on said strips 116, and 117, and have their margins 122, turned over the edges of said limbs. Said channels 115, which are thus rigidly H shaped, rigidly connect the intermediate panels 92, to which they are secured by the bolts 125, which, as shown in Fig. IX, press said inwardly turned margins 122, of the channels against the opposite sides of said panels. The roof panels 97, each comprise opposed sheet metal plates 126, and 127, interfolded to form the upwardly extending end flanges 128, shown in Fig. X, and the side flanges 132, and 133, shown in Fig. XI; the plates in said flanges 128, 132, and 133 being respectively rigidly connected by rivets 130, 134, and 135.

As shown in Fig. XI; the flange 132, of one roof panel 97, is arranged to be interlocked with the flange 133, of the adjoining roof panel 97, and when so interlocked they may be secured by the bolts 136.

The vertical wall panels aforesaid, are secured by bolts 138, to the angle-iron 139, extending around the interior of the chamber and forming the surbase, and by bolts 140, to the angle-iron 142, extending around said chamber at the top and forming the cornice, to which the roof panels are conveniently secured by the bolts 145. As shown, the vertical wall panels which engage the roof panels have vertical flanges at their upper ends which extend to the top of the flanges on the roof panels, for instance, as shown in Figs. X, XIV and XV.

It may be observed that our invention is particularly advantageous in that a room of any desired size may be constructed from stock unit panels of standard size which, being readily connected in substantially air tight relation as described, may be as readily disconnected if it is desired to change the size or shape of the inclosure.

We do not desire to limit ourselves to the precise details of construction and arrangement herein set forth, as it is obvious that various modifications may be made therein without departing from the essential features of our invention, as defined in the appended claims.

We claim:—

1. A building comprising separable hollow wall panels formed of opposed sheet metal plates interlocked to form flanges at their margins whereby said panels are connected, substantially as set forth.

2. A building comprising a series of unit wall panels formed of opposed sheet metal plates interlocked at their margins to form flanges which overlap adjoining panels, substantially as set forth.

3. A building comprising a series of unit wall panels formed of opposed sheet metal plates maintained in spaced relation by brace bars, and interlocked at their margins to form flanges which overlap the adjoining panels, substantially as set forth.

4. A building comprising a series of unit wall panels, formed of opposed sheet metal plates, maintained in spaced relation by brace bars and interlocked at their margins; a filling which is a nonconductor of heat inclosed between said plates; and flanges on said panels which overlap adjoining panels, substantially as set forth.

5. A building comprising a series of panels having flanges extending in a plane with one of their faces, so arranged that the alternate panels have their flanges respectively within and without said building and overlapping the opposite faces of the adjacent panels, substantially as set forth.

6. In a building, the combination with a series of panels forming the walls of said building and comprising flanges extending in a plane parallel with the plane of said panels, arranged to overlap adjacent panels; of corner panels comprising flanges which extend in angular relation to the plane of said corner panels and are arranged to overlap adjacent panels; and, means to maintain said flanges in overlapped relation with said adjacent panels, substantially as set forth.

7. In a building, the combination with a series of panels forming the walls of a building and comprising opposed sheet metal plates whose margins are interlocked to form flanges arranged to overlap adjacent panels; of panels surrounding the doorways of said building and having their plates interlocked at their margins to form reinforced jambs for said doorways; and, means arranged to maintain said flanges in overlapped relation with said adjacent panels, substantially as set forth.

8. In a building, the combination with a series of panels forming the side walls of said building, comprising flanges extending in a plane parallel with the plane of said panels, and arranged to overlap adjacent panels; of corner panels comprising flanges extending in angular relation to the plane of said corner panels and arranged to be joined so that the edge of one corner panel abuts against the inner face of the contiguous corner panel, with its flange overlapping said inner face and the flange of the corner panel overlapping the outer face of the first corner panel, substantially as set forth.

9. In a building, the combination with a series of separable panels comprising flanges arranged to overlap adjacent panels, and flanges which form a continuous ledge at the top of said building; of roof panels arranged to be supported on said ledge, and comprising flanges arranged to overlap adjacent roof panels; and, means arranged to secure all of said panels together, substantially as set forth.

10. In a building, the combination with a series of panels comprising opposed sheet metal plates whose margins are interfolded to form flanges extending from the perimeter of said panels; of spacing bars interposed between said plates; a filling comprising a non-conductor of heat inclosed within said panels; and, means whereby said plates may be secured together with their flanges overlapping the respectively opposite faces of adjacent panels, substantially as set forth.

11. In a building, the combination with corner panels, intermediate panels, style panels, a muntin panel, frieze panels, door panels, and roof panels, all of which comprise opposed sheet metal plates interlocked at their margins to form flanges which overlap adjacent panels; of an angle-iron forming the surbase to which the lower portion of said panels are secured; an angle-iron forming the cornice to which the roof panels and upper portion of the wall panels are secured; hinges for the door panels; locks for said door panels; and, reinforcing plates local to said hinges and locks, substantially as set forth.

12. In a building, the combination with separable panels formed of opposed sheet metal plates interlocked at their margins to form the edges of said panels; of panels comprising opposed sheet metal plates interlocked at their margins to form flanges in angular relation to the plane of said plates and arranged to overlap the adjacent panels; and, channel bars arranged to join said panels in alinement, substantially as set forth.

13. In a building, the combination with separable panels formed of opposed sheet metal plates interlocked at their margins to form the edges of said panels; of panels comprising opposed sheet metal plates interlocked at their margins to form flanges in angular relation to the plane of said plates and arranged to overlap the adjacent panels; and H shaped channel bars arranged to join said panels in alinement and comprising limbs whose extremities are thickened and arranged to bear upon opposite sides of said panels, substantially as set forth.

14. In a building, the combination with separable panels formed of opposed sheet metal plates interlocked at their margins to form the edges of said panels; of panels comprising opposed sheet metal plates interlocked at their margins to form flanges in angular relation to the plane of said plates and arranged to overlap the adjacent panels; and panels forming the roof of said building, comprising flanges extending in angular relation to one of its faces at its opposite edges and arranged to interlock with similar flanges on the adjacent panels, substantially as set forth.

15. In a building, the combination with separable panels formed of opposed sheet metal plates interlocked at their margins to form the edges of said panels; of panels comprising opposed sheet metal plates interlocked at their margins to form flanges in angular relation to the plane of said plates and arranged to overlap the adjacent panels; and panels forming the roof of said building, comprising opposed sheet metal plates having their margins interlocked and riveted to form flanges extending in angular relation to the plane of said plates at the opposite edges of said panels and so arranged that the flanges at one edge of said plates will fit within the flanges at the adjacent edges of the adjoining plates, substantially as set forth.

16. In a building, the combination with separable panels formed of opposed sheet metal plates interlocked at their margins to form the edges of said panels; of panels comprising opposed sheet metal plates interlocked at their margins to form flanges in angular relation to the plane of said plates and arranged to overlap the adjacent panels; and panels forming the roof of said building comprising opposed sheet metal plates having their margins interlocked and riveted to form flanges which extend in angular relation to the plane of said plates at the opposite edges of said panels and so arranged that the flanges at one edge of said plates will fit within the flanges at the adjacent edges of the adjoining plates, and means arranged to secure all of said panels together, substantially as set forth.

In testimony whereof we have hereunto signed our names at Philadelphia, Pennsylvania, this eighth day of June, 1907.

FRANK B. CLAYTON.
GEORGE D. SPIELBERGER.

Witnesses:
CLIFTON C. HALLOWELL,
ANNA F. GETZFREAD.